(12) United States Patent
Kim et al.

(10) Patent No.: US 8,390,757 B2
(45) Date of Patent: Mar. 5, 2013

(54) BACKLIGHT UNIT AND LIQUID CRYSTAL DISPLAY DEVICE HAVING THE SAME

(75) Inventors: Ki Won Kim, Goyang-si (KR); Ki Hyun Cho, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 185 days.

(21) Appl. No.: 12/588,092

(22) Filed: Oct. 2, 2009

(65) Prior Publication Data

US 2010/0085503 A1    Apr. 8, 2010

(30) Foreign Application Priority Data

Oct. 8, 2008  (KR) .................. 10-2008-0098799

(51) Int. Cl.
*G02F 1/1333* (2006.01)
(52) U.S. Cl. ........................................... 349/58; 349/65
(58) Field of Classification Search .................. None
See application file for complete search history.

(56) References Cited

U.S. PATENT DOCUMENTS

| | | | | |
|---|---|---|---|---|
| 5,675,396 A | * | 10/1997 | Tsunehiro | 349/59 |
| 6,437,915 B2 | * | 8/2002 | Moseley et al. | 359/465 |
| 6,961,102 B2 | * | 11/2005 | Kitada et al. | 349/58 |

FOREIGN PATENT DOCUMENTS

| KR | 10-2002-0076356 A | 10/2002 |
|---|---|---|
| KR | 10-2008-0068967 A | 7/2008 |

OTHER PUBLICATIONS

Machine translation of Kawai Tetsuya (JP 2002-286869), Feb. 3, 2010.*

* cited by examiner

*Primary Examiner* — Lucy Chien
(74) *Attorney, Agent, or Firm* — McKenna Long & Aldridge, LLP

(57) ABSTRACT

A backlight unit with a new configuration is disclosed. The backlight unit includes: a main support formed using a mold which opens upward; a light source unit disposed on one side of the main support; a light guide plate disposed parallel to the light source unit and configured to convert dot light emitted from the light source unit into two-dimensional light; and optical sheets disposed on the light guide plate. The main support is provided with a light incident space, which allows light emitted from the light source unit to be entirely and evenly entered to the light guide plate, on its one side opposite to the light source unit.

7 Claims, 5 Drawing Sheets

BACKLIGHT UNIT AND LIQUID CRYSTAL DISPLAY DEVICE HAVING THE SAME

This application claims priority under 35 U.S.C. 119 to Korean Patent Application No. 10-2008-0098799, filed on Oct. 8, 2008, which is hereby incorporated by reference for all purposes in its entirety.

BACKGROUND OF THE INVENTION

1. Field of the Disclosure

This disclosure relates to a backlight unit with a new configuration and a liquid crystal display device having the same.

2. Description of the Related Art

Display devices used for computer monitors or televisions (TVs) include self-light-emitting devices such as organic light emitting displays (OLEDs), vacuum fluorescent displays (VFDs), field emission displays (FEDs), and plasma display panels (PDPs), as well as non self-light emitting devices such as liquid crystal displays (LCDs). A general LCD device includes two substrates having electric field generation electrodes and a liquid crystal layer having dielectric anisotropy and interposed between the substrates. When a certain voltage is applied to the electric field generation electrodes, an electric field is generated in the liquid crystal layer. The strength of the electric field is adjusted by changing the voltage. Thus, a desired image is displayed by controlling the transmissivity of light passing through the liquid crystal layer.

The LCD device includes a data driver, a gate driver, and a backlight unit. The data driver externally receives image data, generates data signals of pixels and supplies the generated data signals to data lines of an LCD panel. The gate driver generates a gate signal to drive the pixels of one line of the LCD panel and supplies the generated gate signal to a gate line of the LCD panel. The backlight unit is disposed on the rear surface of the LCD panel and provides light.

Cold cathode fluorescent lamps (CCFLs), external electrode fluorescent lamps (EEFLs), or light emitting diodes (LEDs) are used as the light source of a general backlight unit. Recently, LEDs are being increasingly used as the light source of a backlight unit due to merits such as a long lifespan. LEDs are generally mounted on a printed circuit board (PCB) or a flexible printed circuit board (FPC) which is disposed at one side of the backlight unit.

FIG. 1 is an exploded perspective view showing a small-sized LCD device of the related art. As shown in FIG. 1, an small-sized LCD device of the related art includes an LCD panel 110 with a thin film transistor substrate 111 and a color filter substrate 112, a panel drive unit 113 disposed at one side of the LCD panel 110 and configured to drive the LCD panel 110, and a backlight unit 120 disposed under the LCD panel 110 and configured to apply light to the LCD panel 110.

The panel drive unit 113 includes driver chips 114 and a first FPC 115.

The backlight unit 120 includes a main support 180 formed using a mold of a rectangular rim, a second FPC 153 disposed on one side edge of the main support 180, and a plurality of LEDs 151 loaded on the second FPC 153. The backlight unit 120 further includes a reflective sheet, a light guide plate 160, and optical sheets which are sequentially placed. The plural LEDs 151 are inserted into receiving holes 183 formed on one inner side wall of the main support 180, respectively.

Such a small-sized LCD device is used in a cellular phone (or mobile phone), a small-sized display device, etc., garnering on their thin size. Recently, however, the application of these display devices has gradually expanded. As such, these display devices are used in a growing variety of fields. In view of this point, such display devices must be developed in a variety of types suitable to the expanding field of application.

SUMMARY OF THE INVENTION

Accordingly, the present embodiments are directed to a backlight unit that substantially obviates one or more of problems due to the limitations and disadvantages of the related art, as well as an LCD device.

An object of the present embodiments is to provide a backlight unit with a new configuration as well as an LCD device having the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a main support formed using a mold which opens upward; a light source unit disposed on one side of the main support; a light guide plate disposed parallel to the light source unit and configured to convert dot light emitted from the light source unit into two-dimensional light; and optical sheets disposed on the light guide plate. The main support is provided with a light incident space, which allows light emitted from the light source unit to be entirely and evenly entered to the light guide plate, on its one side opposite to the light source unit.

An LCD device according to another aspect of the present embodiment includes: a liquid crystal display panel configured to formed a circular display surface for displaying an image; a main support disposed under the liquid crystal display panel and formed using a mold which opens upward; a light source unit disposed on one side of the main support; a light guide plate disposed parallel to the light source unit and configured to convert dot light emitted from the light source unit into two-dimensional light; and optical sheets disposed on the light guide plate. The light guide plate and the optical sheets are all formed in a circular shape. The main support is configured to include a portion housing the light guide plate and the optical sheets, another portion in which the light source unit is disposed, and a light incident space, which allows light emitted from the light source unit to be entirely and evenly entered to the light guide plate, on its one side opposite to the light source unit.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE ILLUSTRATED EMBODIMENTS

Figure 1:
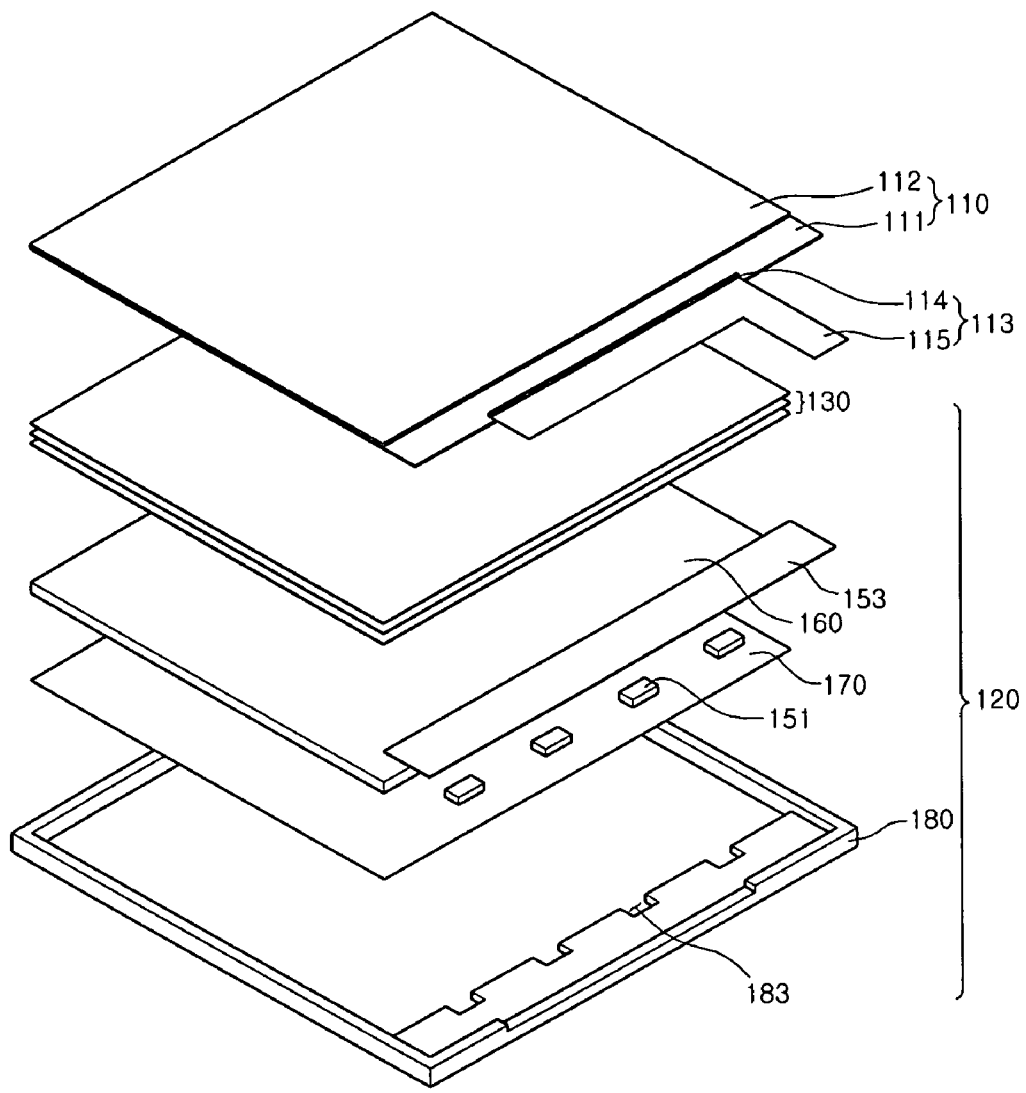
FIG. 1 is an exploded perspective view showing a small-sized LCD device of the related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
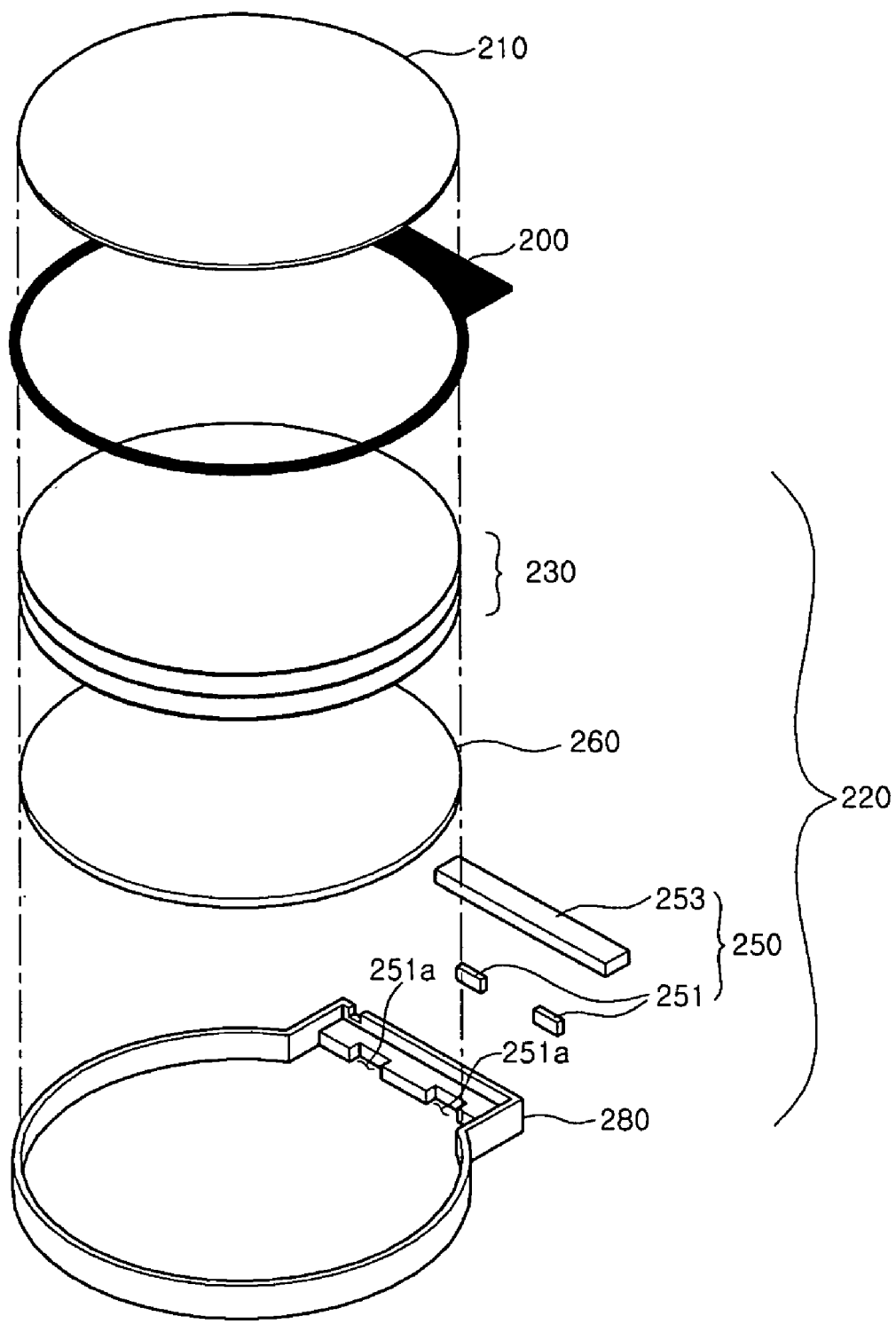
FIG. 2 is an exploded perspective view showing an LCD device according to a first embodiment of the present disclosure.

FIG. 2 is an exploded perspective view showing an LCD device according to a first embodiment of the present disclosure. Referring to FIG. 2, an LCD device according to a first embodiment of the present disclosure includes an LCD panel 210 for displaying an image and a backlight unit 220 disposed on the rear surface of the LCD panel 210 and providing light to the LCD panel 210.

Although it is not shown in detail in the drawings, the LCD panel 210 includes a thin film transistor (TFT) array substrate and a color filter substrate which are combined together to face each other and maintain a uniform cell gap therebetween, as well as a liquid crystal layer interposed between the TFT array substrate and the color filter substrate. Also, a drive unit (not shown) is disposed at one side of the LCD panel 210 in order to drive the LCD panel 210. The display face of the LCD panel 210 has a circular shape.

The backlight unit 220 disposed under the LCD panel 210 includes a main support 280 formed using a mold which opens upward, a light source unit 250 disposed on one side of the main support 280, a light guide plate 260 disposed parallel to the light source unit 250, and optical sheets 230 disposed on the light guide plate 260.

The optical sheets 230 converge and diffuse light to be applied from the light guide plate 260 to the LCD panel 210. All of the optical sheets 230 are formed in a circular shape.

The light guide plate 260 converts dot light into two-dimensional light. More specifically, the light guide plate 260 converts dot light incident from the light source unit 250 disposed on one side of the main support 280 into two-dimensional light and guides the converted two-dimensional light toward the LCD panel 210. Such a light guide plate 260 is entirely formed in a circular shape.

The light source unit 250 includes an FPC 253 and a plurality of LEDs 251 arranged on the rear surface of the FPC 253. The FPC 253 is a printed circuit substrate including an insulation film and complex circuit wirings formed on the insulation film. In other words, the FPC 253 may be formed of a heat-resistant plastic film such as polyester (PET) or polyimide (PI).

The main support 280 is formed using a mold which opens upward. The main support 280 is formed in a circular rim shape with the exception of a portion opposite to the light source unit 250. The main support 280 houses the light guide plate 260, the optical sheets 230, and the light source unit 250 on its inner side. On one inner side wall of the main support 280, a plurality of receiving recesses 251a are formed to each receive the LEDs 251.

A shade tape 200 is included in the backlight unit 220 of the above configuration. The shade tape 200 is disposed opposite to the light source unit 250 and the edge of the main support 280 within the backlight unit 220 and forces the optical sheets 230 and the light source unit 250 to be fixed on the main support 280. Also, the shade tape 200 forces the LCD panel 210 to be fixed to the backlight unit 220. To this end, adhesives are coated on both side surfaces of the shape tape 200. Furthermore, the shade tape 200 has a black color so that the light emitted from the backlight unit 220 does not leak toward the exterior.

In this manner, the LCD device according to a first embodiment of the present disclosure is configured to have a display surface of a circular shape. Accordingly, the LCD device can be applied to electric appliances for displaying images on a circular region. For example, the LCD device may be applied to a circular clock (watch) of the display system. In other words, the LCD device can be applied to electric appliances which are configured in a circular shape such as a clock (or watch) displaying an image in the circular screen.

Figure 3:
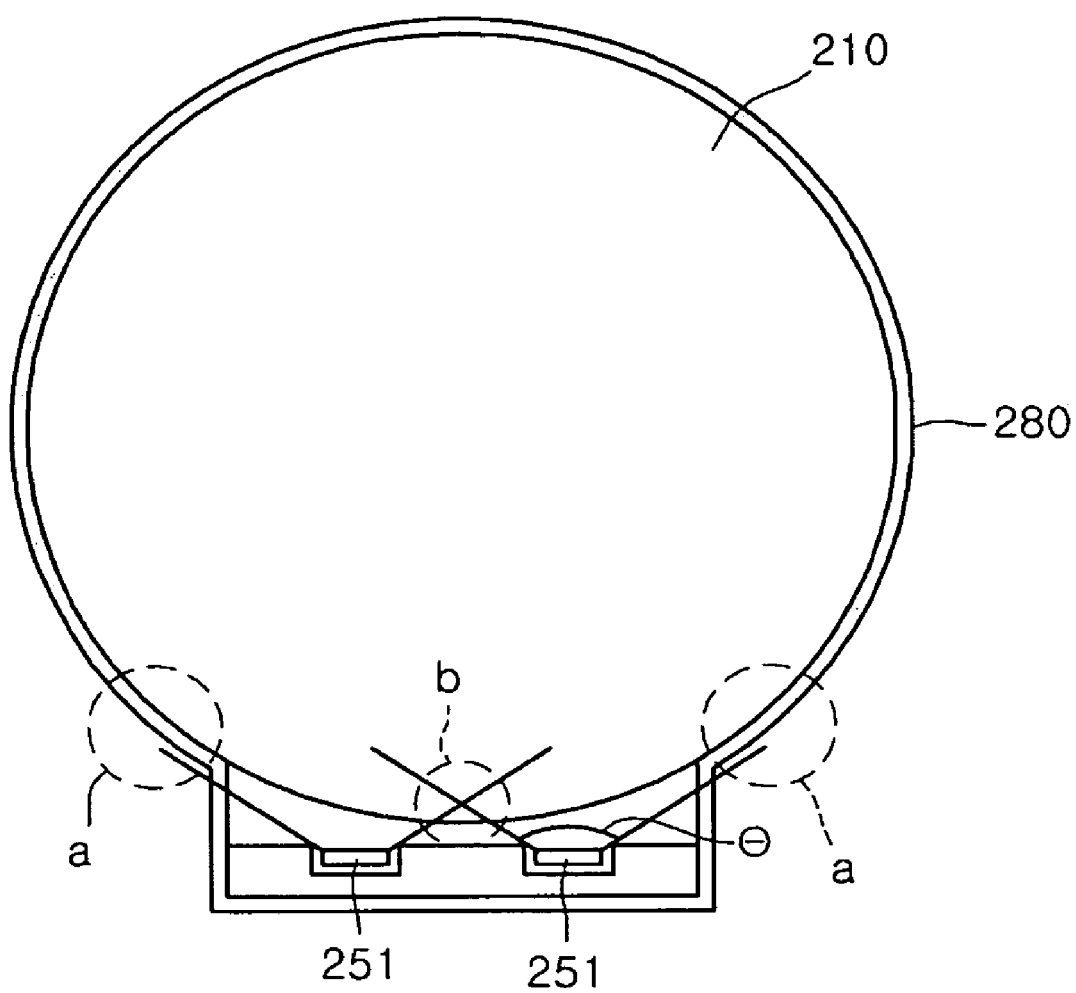
FIG. 3 is a planar view showing an LCD device according to the first embodiment of the present disclosure.

FIG. 3 is a planar view showing an LCD device according to a first embodiment of the present disclosure. As shown in FIG. 3, an LCD device according to a first embodiment of the present disclosure is configured such that a plurality of LEDs 251 are arranged on one inner side wall of a circular main support 280.

The plural LEDs 251 have a fixed light-emission angle θ. Actually, LEDs included in the related art LCD device have a light-emission angle θ of about 120°.

On the other hand, a light guide plate (not shown) and optical sheets (not shown) are configured in the main support 280 in such a manner as to be in surface-contact with the inner sidewall of the main support 280.

In this way, the LCD device according to a first embodiment of the present disclosure forces the LEDs 251 to be arranged on one inner sidewall of the main support 280 and to emit light at a fixed light-emission angle θ which is set up during the manufacturing process. As a result, none of the light emitted from the LEDs 251 reaches an intersection region "b" of the light emission ranges of the LEDs 251 as well as regions corresponding to the edges of the LEDs 251, i.e., both side edge regions "a" of the light source unit. Accordingly, dark portions may be generated in the LCD device.

Figure 4:
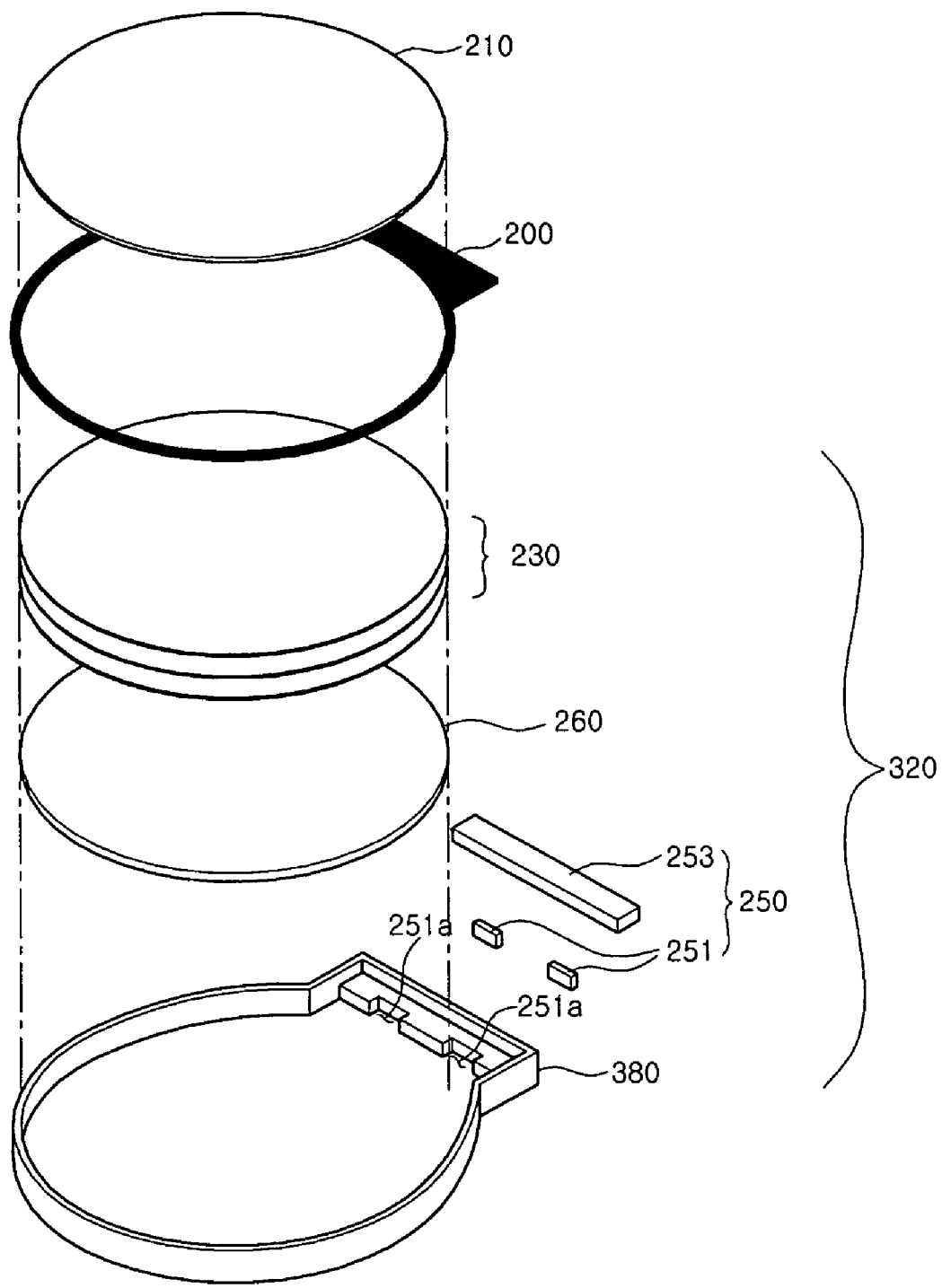
FIG. 4 is an exploded perspective view showing an LCD device according to a second embodiment of the present disclosure.
Figure 5:
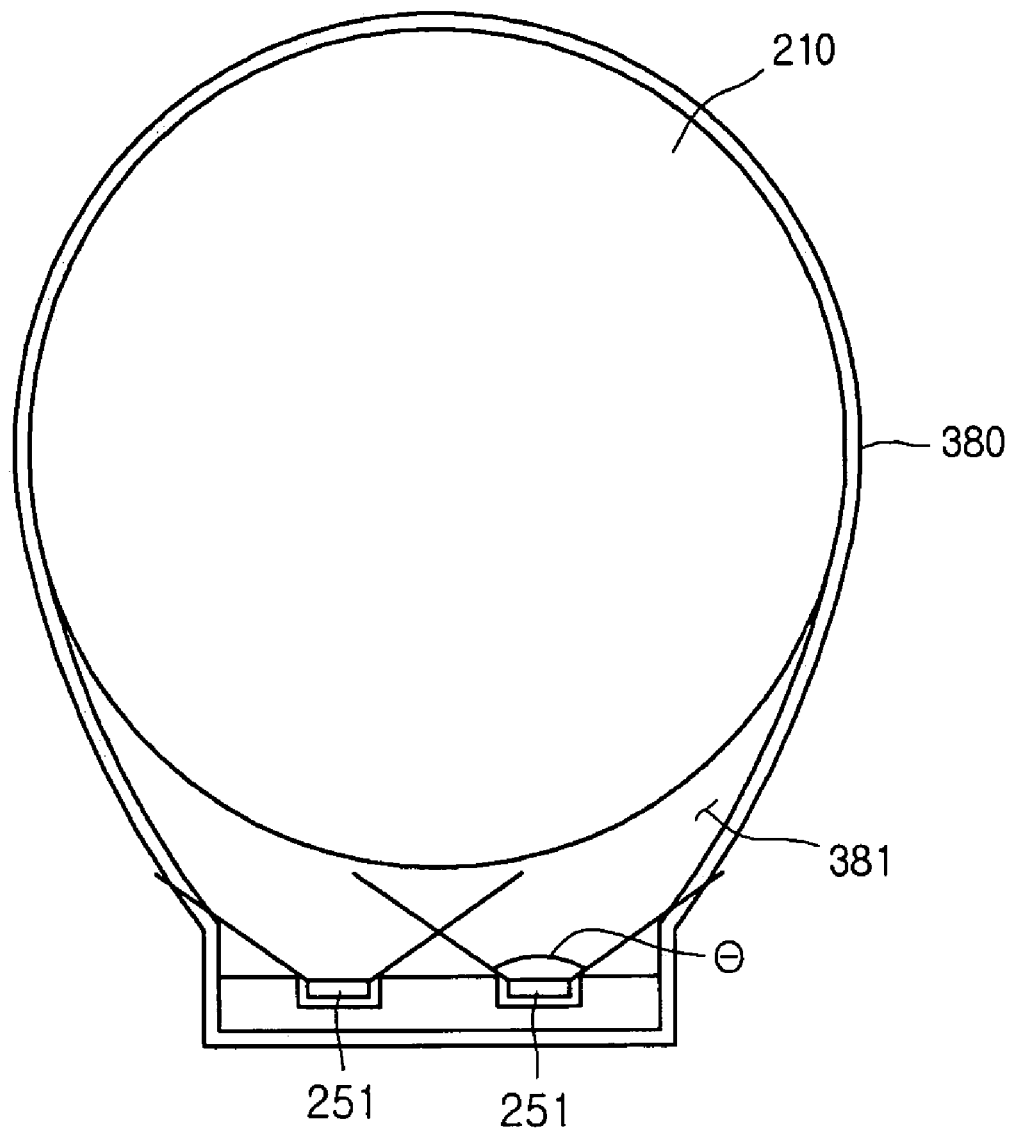
FIG. 5 is a planar view showing an LCD device according to the second embodiment of the present disclosure.

FIG. 4 is an exploded perspective view showing an LCD device according to a second embodiment of the present disclosure. FIG. 5 is a planar view showing an LCD device according to this second embodiment of the present disclosure. The LCD device of the second embodiment shown in FIGS. 4 and 5 has the same configuration as the one of the first embodiment, except for a main support 380 and a shade tape 200. The constituent elements shown in FIGS. 4 and 5 having the same structures, operations, and functions as those of the constituent elements shown in FIGS. 2 and 3 are referred to using the same reference numerals and their detailed descriptions will be omitted because they are already clearly described in the descriptions with reference to FIGS. 2 and 3.

The main support 380 forms a light incident space 381 adjacent to a region in which a light source unit 250 is disposed, in order to allow light emitted from the LEDs 251 to be entirely and evenly entered into the light guide plate 260. In other words, the light incident space 381 prevents dark portions from being generated on the displayed image in areas corresponding to the intersection region "b" of the light emission ranges of the LEDs 251 as well as regions corresponding to the edges of the LEDs 251 (i.e., both side edge regions "a" of the light source unit 250). The light incident space 381 varies along the light-emission angle θ of the LED 251.

The light incident space 381 can be provided in an area which can be defined as a non-display area not actually displaying any image. As such, the side surfaces of the light guide plate 260 and the optical sheets 230 are not in contact with the inner sidewall of the main support 380, due to the light incident space 381. In other words, the side surfaces of the light guide plate 260 and the optical sheets 230 are disposed separately from the inner sidewall of the main support 380 at a fixed distance corresponding to the light incident space 381.

For the convenience of explanation regarding the light incident space 381, the shade tape 200 is not shown in FIG. 5. Actually, the shade tape 200 is disposed under the LCD panel 210 and is opposite to the edge of the main support 380 and the light incident space 381. Accordingly, the shade tape 200 prevents light leakage from the edge of the main support 380 including the light source unit 250 and the light incident space 381.

Although the backlight unit 320 according to the second embodiment of the present disclosure is explained in a configuration whereby the inner sidewall of the main support 380 is separated from the side surfaces of the light guide plate 260 and the optical sheets 230 by the light incident space 381, the backlight unit is not limited to this. For example, the backlight unit 320 can be formed in a configuration where the light guide plate 260 and the optical sheets 230 are expanded outward and the inner sidewall of the main support 380 comes in surface contact with the side surfaces of the light guide plate 260 and the optical sheets 230 in the entire region of the main support 380 except the light incident space 381.

As described above, the LCD device according to the second embodiment of the present disclosure provides the light incident space 381 on one end of the inside of the main support 380, thereby preventing the generation of dark portions due to the light-emission angle θ of the LED 251. Accordingly, the LCD device can improve display quality.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
   a main support formed using a mold which opens upward;
   a plurality of light source units disposed on one side of the main support;
   a light guide plate disposed parallel to the light source units and configured to convert dot light emitted from the light source units into two-dimensional light; and
   optical sheets disposed on the light guide plate,
   wherein the main support is provided with a light incident space, which allows light emitted from the light source units to be entirely and evenly entered to the light guide plate, on its one side opposite to the light source units,
   wherein the light incident space is in areas corresponding to an intersection region and both side edge regions of light emission ranges of the light source units,
   wherein the intersection region is formed on dark portions crossed lights emitted from each of the light source units,
   wherein the light source includes a flexible printed circuit board and a plurality of light emitting diodes arranged on a rear surface of the flexible printed circuit board, and
   wherein the light incident space is formed between the plurality of light source units and the light guide plate.

2. The backlight unit claimed as claim 1, wherein the side surfaces of the light guide plate and the optical sheets opposite to the light incident space are separated at a fixed distance from the inner sidewall of the main support.

3. The backlight unit claimed as claim 1, wherein the light incident space is formed in a non-display area.

4. A liquid crystal display device comprising:
   a liquid crystal display panel configured to form a circular display surface for displaying an image;
   a main support disposed under the liquid crystal display panel and formed using a mold which opens upward;
   a plurality of light source units disposed on one side of the main support;
   a light guide plate disposed parallel to the light source units and configured to convert dot light emitted from the light source units into two-dimensional light; and
   optical sheets disposed on the light guide plate,
   wherein the light guide plate and the optical sheets are all formed in a circular shape, and the main support is configured to include a portion housing the light guide plate and the optical sheets, another portion in which the light source units are disposed, and a light incident space, which allows light emitted from the light source units to be entirely and evenly entered to the light guide plate, on its one side opposite to the light source unit,
   wherein the light incident space is in areas corresponding to an intersection region and both side edge regions of light emission ranges of the light source units,
   wherein the intersection region is formed on dark portions crossed lights emitted from each of the light source units,
   wherein the light source includes a flexible printed circuit board and a plurality of light emitting diodes arranged on a rear surface of the flexible printed circuit board, and
   wherein the light incident space is formed between the plurality of light source units and the light guide plate.

5. The liquid crystal display device claimed as claim 4, wherein the side surfaces of the light guide plate and the optical sheets opposite to the light incident space are separated at a fixed distance from the inner sidewall of the main support.

6. The liquid crystal display device claimed as claim 4, wherein the light incident space is formed in a non-display area.

7. The liquid crystal display device claimed as claim 4, further comprising a shade tape disposed on the light incident space, the light source units, and the edge of the main support.

* * * * *